June 18, 1940.    R. E. RANKIN    2,204,770
SHAKER CONVEYER
Filed Feb. 2, 1938
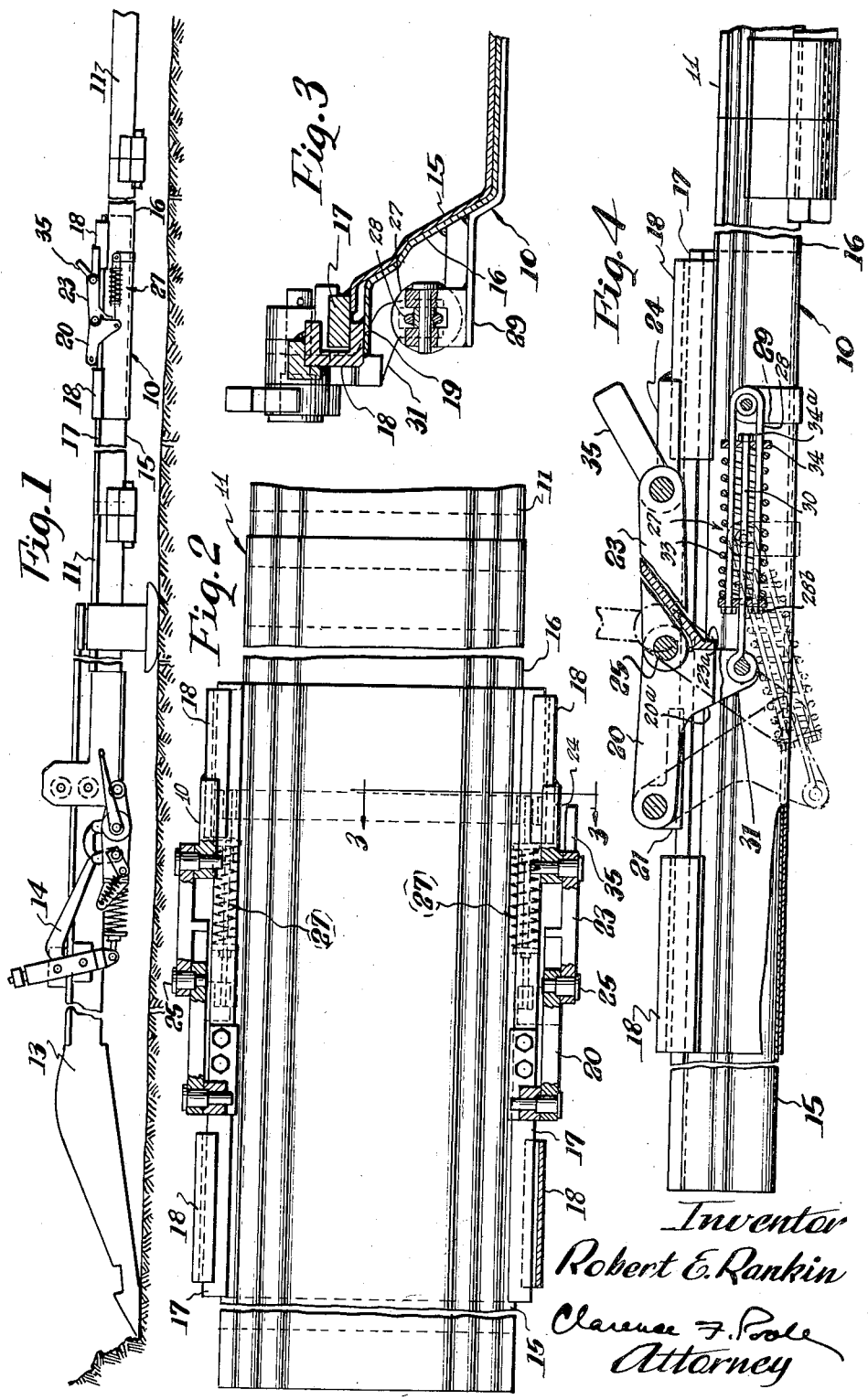
Inventor
Robert E. Rankin
Clarence F. Poole
Attorney Patented June 18, 1940

2,204,770

UNITED STATES PATENT OFFICE 2,204,770

SHAKER CONVEYER

Robert E. Rankin, Avalon, Pa., assignor to Goodman Manufacturing Company, Chicago, Ill., a corporation of Illinois Application February 2, 1938, Serial No. 188,256

7 Claims. (Cl. 198—220)

This invention relates to improvements in shaker conveyers of the type adapted to be used in mines, and more particularly relates to a means for releasing overloads from a shaker conveyer trough line.

Heretofore, much difficulty has been encountered due to breakage of the conveyer drive or trough line caused by overload on either the drive or trough line. This overload condition is usually the result of extending the trough line to too great a length for the weight of the troughs used or length of grade along which it is desired to move the material, or by striking a solid abutment with either the forward or rear end of the trough line. Under such conditions the drive usually breaks first. If, however, the capacity of the drive is sufficient to withstand the stresses imparted by this overload condition the pans of the trough line will buckle and raise off of their supports and engage the roof in places of low head room, or the connecting bolts between the troughs will elongate or pull out. These breakages of both the drive and trough line, besides being dangerous, also cause considerable expense and loss of time in putting the conveyer back into working condition.

Among the objects of my invention is to overcome these difficulties by providing a means for automatically releasing overloads from the trough line upon overload of the drive or trough line to prevent breakage of either the drive or the trough line.

Another object of my invention is to provide an overload release for a shaker conveyer trough line of a novel, efficient, and simplified construction which consists in providing a yieldable connection between two trough sections to hold said trough sections together to move as a unit when the stresses on the trough line are normal, or to permit said trough sections to telescope with respect to each other upon overload of the drive or trough line.

Other objects of my invention will appear from time to time as the accompanying specification proceeds.

My invention may be more clearly understood with reference to the accompanying drawing wherein:

Figure 1 is a side elevation of a shaker conveyer trough line with an overload releasing device constructed in accordance with my invention associated therewith;

Figure 2 is an enlarged fragmentary plan view of a portion of the trough line with parts of the overload releasing device broken away and shown in section in order to show certain details of construction thereof;

Figure 3 is an enlarged transverse sectional view taken substantially along line 3—3 of Figure 2; and Figure 4 is an enlarged fragmentary side elevational view of the trough line showing certain details of the overload releasing device in longitudinal section.

Referring now in particular to the drawing, illustrating one form in which my invention may be embodied, a shaker conveyer pan or trough line is shown having an overload release, generally indicated by reference character 10, connected to the ends of troughs 11, 11 of said trough line. Said trough line is reciprocably driven by means of a suitable drive mechanism of a usual construction (not shown) and the overload release may be disposed adjacent said drive, instead of the forward end of the trough line as is shown herein. Also, more than one overload release may be used if desired, one being positioned adjacent the drive to protect the drive, and the other adjacent the forward end of the conveyer to protect the trough line. A pickup member or shovel 13 is herein shown as being provided on the forward end of said trough line which may be extended or retracted with respect thereto by means of a suitable friction grip feeding device generally indicated by reference character 14. Said feeding device is of an ordinary construction well known to those skilled in the art and is no portion of my present invention so will not herein be shown or described in detail.

The overload release 10 includes a trough section 15 connected to one of the trough sections 11 and nested within a trough section 16 which is connected in the trough line to another trough section 11. Guide means are provided between said trough sections to permit them to telescopically move with respect to each other which includes bearing plates 17, 17 extending laterally from the upper ends of the trough section 15. Said bearing plates are adapted to be guided in pairs of spaced inwardly extending channeled guides 18, 18 secured to the upper sides of flanges 19, 19 of the trough section 16 adjacent opposite ends thereof (see Figure 3).

A connection is provided between the trough sections 15 and 16 to hold said trough sections for reciprocable movement as a unit or to permit said trough sections to telescope with respect to each other upon overload of the pan line, which as herein shown includes a toggle linkage connection interposed between said trough sections intermediate the ends thereof and on opposite sides thereof. Since the construction and operation of said linkage connection on each side of said trough sections is the same, the connection on one side only need herein be described in detail. Said linkage connection includes a toggle link 20 pivotally connected at one of its ends to a bracket 21 secured to and extending upwardly from the bearing plate 17. In a like manner, a toggle link 23 is pivotally connected to a bracket 24, which is herein shown as being secured to and projecting from one of the channeled guides 18. Said toggle links are pivotally connected together by means of a pivotal pin 25. The toggle link 23 is provided with a depending stop 23a which is adapted to abut the end of a portion 20a depending from the toggle link 20 to positively hold the axis of the pin 25 a predetermined distance below the axes of connection of said links to the trough sections 15 and 16, respectively, and to prevent upward movement of the links to a dead center position.

A yieldable link 27 is provided to hold the toggle links 20 and 23 in substantially extended relation with respect to each other. Said yieldable link, as herein shown, includes a preloaded spring 33 adapted to act as a tension spring to hold the links 20 and 23 in extended relation with respect to each other and adapted to compress upon breaking of the joint between said links. Said spring is pivotally connected to a bracket 29 projecting outwardly and upwardly from the lower side of the trough section 16, and disposed beneath the outwardly flared portion thereof, by means of a U-shaped member or rod 28 having an open eye formed at the bend thereof. Said U-shaped rod extends through the inside of the coils of said spring and its ends extend through a collar 28a abutting the end of said spring opposite from the bracket 29. Said collar is held to said U-shaped rod by means of suitable nuts 28b, 28b threaded on the ends of said rod. An eyebolt 30 is pivotally connected at its open eye to the lower end of a depending portion 31 of the link 20. Said depending portion extends inwardly and downwardly from said link beneath the flared portion of the trough 16. Said eyebolt extends through the coils of said spring and is held in engagement with the end of said spring opposite from the collar 28a by means of a collar 34 abutting the end of said spring adjacent the bracket 29 and through which said eyebolt extends, and a nut 34a threaded on the end of said eyebolt. When the spring link 27 is assembled and connected between the member 31 and bracket 29, it may be loaded a predetermined amount and then connected to said member and bracket by means of the U-rod 28 and eyebolt 30 so that the spring 33 will be under tension and act as a tension spring to cause the eyebolt 30 to exert a pulling force on the depending portion 31 of the link 20 to hold said links in extended relation with respect to each other.

It should here be noted that upon the forward stroke of the conveyer the trough section 15 is moved in a forward direction with the trough section 16 and the conveyer trough line, through the links 23 and 20, which are in compression, and the spring 33 which exerts a force against the link 20 opposite to the force exerted against said link by the link 23 and thus tends to prevent breaking of the joint between said links. Upon the return stroke of the conveyer the trough section 15 is pulled rearwardly by the trough section 16 through the link 23 which exerts a pulling action on the link 20. The overload device is thus inoperative upon the return stroke of the conveyer. When the joint between the links 20 and 23 breaks, due to overload conditions on the forward end of the trough line, which are great enough to counteract the tendency for the spring 33 to hold the links 20 and 23 in extended relation with respect to each other, the links 20 and 23 will be pivoted downwardly against the spring 33 to the position shown by broken lines in Figure 4, permitting reciprocable movement of the rear part of the conveyer with respect to the front part of the conveyer and removing the danger of breakage of the drive or buckling of the conveyer trough sections. A hand lever 35, herein shown as being connected to the link 23, is provided to permit the overload release to be reset manually when the overload conditions are relieved and it is desired that the trough sections 15 and 16 operate as a unit.

It should also be noted that the springs 33, 33 may be set to have a greater or less strength, or interchanged with other heavier or lighter springs to permit the overload release to release at the desired safe maximum stresses on the drive or trough line. If more than one overload release is used in the trough line, one may be positioned adjacent the front of the trough line and may be set for the maximum safe stresses on the trough line, while another may be positioned adjacent the drive and may be set for the maximum safe stresses on the drive. Also, if desired, the overload release may be inserted at any desired position in the trough line and manually tripped to permit one part of the trough line to be stopped while the remainder of the trough line continues to operate. It should further be noted that the overload release is herein shown as being operative in one direction only and if it be desired that it operate when the rear end of the trough line engages an obstruction its position in the pan line may be reversed.

It will be seen from the foregoing that a simple form of overload release for a shaker conveyer trough line has been provided which is adapted to prevent breakage of the drive or trough line caused by overload and includes a pair of telescopic trough sections connected in the trough line and having a yieldable toggle linkage connection interposed therebetween to hold these trough sections together for reciprocable movement as a unit, which connection is so arranged as to break upon overload of the trough line or drive and permit said trough sections to telescopically move with respect to each other until the device is reset, and that said overload releasing mechanism is of a novel, simple, efficient, and compact construction.

While I have herein shown and described one form in which my invention may be embodied, it will be understood that the construction thereof and the arrangement of the various parts may be altered without departing from the spirit and scope thereof. Furthermore, I do not wish to be construed as limiting myself to the specific embodiment illustrated, excepting as it may be limited in the appended claims.

I claim as my invention:

1. An overload release for a shaker conveyer trough line including a yieldable linkage connection between two trough sections in said trough line for permitting telescopic movement of said trough sections with respect to each other upon overload of said trough line including a pair of links pivotally connected together, one of said links being connected to one of said trough sections and the other to the other trough section, means to restrict movement of said links to a dead center position, and a yieldable member adapted to hold said links in extended relation with respect to each other, said member being pivotally connected to one of said trough sections and having pivotal connection with said link which is pivotally connected to said other trough section.

2. An overload release for a shaker conveyer trough line including a yieldable linkage connection between two trough sections in said trough line for permitting telescopic movement of said trough sections with respect to each other upon overload of said trough line including a pair of links pivotally connected together, one of said links being pivotally connected to one of said adjoining sections and the other to the other trough section, means to restrict movement of said links to a dead center position, and a yieldable link adapted to hold said links in extended relation with respect to each other, said link being pivotally connected to one of said trough sections and having pivotal connection with the link which is pivotally connected to said other trough section at a point offset from the point of connection of said links together.

3. An overload release for a shaker conveyer trough line including a yieldable linkage connection between two trough sections in said trough line for permitting telescopic movement of said trough sections with respect to each other upon overload of said trough line including a pair of links pivotally connected together, one of said links being pivotally connected to one of said trough sections and the other to the other trough section, means to restrict movement of said links to a dead center position, and a tension spring adapted to hold said links in extended relation with respect to each other, said spring being interposed between one of said trough sections and the link which is pivotally connected to said other trough section.

4. An overload release for a shaker conveyer trough line including a yieldable linkage connection between two trough sections in said trough line for permitting telescopic movement of said trough sections with respect to each other upon overload of said trough line including a pair of links pivotally connected together, one of said links being pivotally connected to one of said trough sections and the other to the other trough section, means to restrict movement of said links to a dead center position, and a tension spring adapted to hold said links in extended relation with respect to each other, said spring being connected between one of said trough sections and the link which is pivotally connected to said other trough section at a point offset from the point where said links are pivotally connected together, said spring being of sufficient strength to hold said links in substantially extended relation with respect to each other to hold said trough sections for movement together and said point of connection of said spring to said link being so arranged as to hold said links in such a position that the point of connection of said links together is out of alignment with the points of connection of said links to said trough sections, to permit the joint between said links to break against said spring upon overload of said trough line.

5. In an overload release for a shaker conveyer trough line including two nested trough sections, two links pivotally connected together and having pivotal connection with adjacent ends of said trough sections, a stop on one of said links, engaging said other link, to restrict movement of said links to a dead center position, and yieldable means engaging one of said links for holding said links in extended relation with respect to each other and permitting the joint between said links to break upon a predetermined load on said yieldable means, to permit one of said trough sections to move telescopically with respect to the other, upon a predetermined load on said trough line.

6. In an overload release for a shaker conveyer trough line including two nested trough sections, a toggle link connection for holding said trough sections to move as a unit or permitting one trough section to move telescopically with respect to the other including a pair of links pivotally connected together and to adjacent ends of said trough sections, means to restrict movement of said links to a dead center position, and a yieldable link connected between said links and one of said trough sections at a point offset from the point of pivotal connection of said links together, to hold said links in extended relation with respect to each other, and to permit the joint between said links to break upon a predetermined load on said yieldable link.

7. In an overload release for a shaker conveyer trough line including two nested trough sections, two links pivotally connected together and having pivotal connection with adjacent ends of said trough sections, a stop on one of said links, engaging said other link, to restrict movement of said links to a dead center position, and a spring link pivotally connected between one of said trough sections and said link which is pivotally connected to said other trough section, for holding said links in extended relation with respect to each other, to hold said trough sections to move as a unit, said spring link also serving to permit the joint between said links to break, to permit one of said trough sections to move telescopically with respect to the other upon a predetermined load on said trough line.

ROBERT E. RANKIN.